US012362451B2

(12) United States Patent
Vosoogh

(10) Patent No.: US 12,362,451 B2
(45) Date of Patent: Jul. 15, 2025

(54) MULTI-LAYER WAVEGUIDE HAVING A WAVEGUIDE CHANNEL APERTURE SURROUNDED BY AT LEAST ONE METASURFACE HAVING THICK AND THIN SECTIONS

(71) Applicant: GAPWAVES AB, Gothenburg (SE)

(72) Inventor: Abbas Vosoogh, Gothenburg (SE)

(73) Assignee: GAPWAVES AB, Gothenburg (SE)

(*) Notice: Subject to any disclaimer, the term of this patent is extended or adjusted under 35 U.S.C. 154(b) by 244 days.

(21) Appl. No.: 18/001,171

(22) PCT Filed: Jun. 1, 2021

(86) PCT No.: PCT/SE2021/050506
§ 371 (c)(1),
(2) Date: Dec. 8, 2022

(87) PCT Pub. No.: WO2021/251866
PCT Pub. Date: Dec. 16, 2021

(65) Prior Publication Data

US 2023/0223671 A1 Jul. 13, 2023

(30) Foreign Application Priority Data

Jun. 9, 2020 (SE) .................................... 2050679-6

(51) Int. Cl.
*H01P 3/12* (2006.01)
*H01P 1/203* (2006.01)
(Continued)

(52) U.S. Cl.
CPC .......... *H01P 3/121* (2013.01); *H01P 1/20345* (2013.01); *H01Q 13/22* (2013.01); *H01Q 21/064* (2013.01)

(58) Field of Classification Search
CPC ................................ H01P 3/121; H01Q 13/22
(Continued)

(56) References Cited

U.S. PATENT DOCUMENTS

2018/0375185 A1 12/2018 Kirino et al.
2020/0076037 A1* 3/2020 Kishk et al. ............ H01P 3/006
(Continued)

FOREIGN PATENT DOCUMENTS

RU 2696676 C1 8/2019
WO 2019083439 A1 5/2019

OTHER PUBLICATIONS

Extended European Search Report dated Mar. 24, 2023, issued by the European Patent Office in corresponding European Application No. 23159350.0-1205. (14 pages).
(Continued)

*Primary Examiner* — Benny T Lee
(74) *Attorney, Agent, or Firm* — Buchanan Ingersoll & Rooney PC

(57) ABSTRACT

A multi-layer waveguide comprising at least three physical layers assembled into a multi-layer waveguide. The layers are a top layer, one or more intermediate layer, and a bottom layer. The multi-layer waveguide further comprises a waveguide channel being an elongated aperture in at least one intermediate layer. At least one layer has a metasurface on a first surface facing a first adjoining layer, wherein the metasurface surrounds the elongated aperture and comprise thick and thin sections.

14 Claims, 7 Drawing Sheets

(51) Int. Cl.
*H01Q 13/22* (2006.01)
*H01Q 21/06* (2006.01)

(58) Field of Classification Search
USPC .................................................. 333/239, 237
See application file for complete search history.

(56) References Cited

U.S. PATENT DOCUMENTS

| | | | | |
|---|---|---|---|---|
| 2020/0185802 | A1 | 6/2020 | Vilenskiy et al. | |
| 2020/0220273 | A1* | 7/2020 | Ahmadloo ......... | H01Q 21/0043 |
| 2020/0373678 | A1* | 11/2020 | Park et al. .............. | H01P 3/121 |

OTHER PUBLICATIONS

Hesler, J. "A Photonic Crystal Joint (PCJ) for Metal Waveguides" IEEE, 2001, pp. 783-786. XP-001067384.

International Search Report (PCT/ISA/210) and Written Opinion (PCT/ISA/237) mailed on Aug. 17, 2021, by the European Patent Office as the International Searching Authority for International Application No. PCT/SE2021/050506.

Vosoogh et al., "Novel Air-Filled Waveguide Transmission Line Based on Multilayer Thin Metal Plates", IEEE Transactions on Terahertz Science and Technology, vol. 9, No. 3, May 1, 2019, pp. 282-290.

* cited by examiner

MULTI-LAYER WAVEGUIDE HAVING A WAVEGUIDE CHANNEL APERTURE SURROUNDED BY AT LEAST ONE METASURFACE HAVING THICK AND THIN SECTIONS

TECHNICAL FIELD

The present invention relates generally to a multi-layer waveguide transmission line with layers comprising electromagnetic metasurfaces.

BACKGROUND ART

Waveguides are well known in the art and a common component used to carry electromagnetic waves from a starting point to an endpoint. In its most general term, a waveguide could be a hollow metal pipe.

For waves propagating in open space, power is lost over distance thereby reducing both the possible transmission distance and the quality of a wave. Waveguides are therefore a structure adapted to guide waves by restricting the expansion directions of the wave in at least one dimension. The concept is to restrict the wave, thereby forcing the wave to propagate in a specific direction and thereby reducing the losses. In ideal conditions, this concept would result in the wave losing no power at all. However, this is rarely or never the case. Depending on the waveguide transmission line there is loss and leakage and the waves couple to the edges of the waveguide channels creating energy losses. The concept of waveguides has been known for a long time and is used for transmitting for example signals, sound, or light.

Simultaneously, the use of wireless communication increases and there is a demand from the market for waveguides and antenna arrays based on such technology. The demand from the market further requires compact and inexpensive waveguides.

One available solution is substrate integrated waveguides (SIW) that are compact waveguides based on printed circuit board (PCB) technology and connected top and bottom layers using via holes. Via holes are holes extending between the layers of a waveguide, connecting at least the top and bottom layers. Although cost efficient production methods exist for substrate integrated waveguides the cost increase with increasing frequency due to need for high frequency dielectric.

Another available solution is so called gap waveguide technology. Gap waveguides are generally constructed from two parts where one has pins forming a barrier that prevent propagation of electromagnetic waves in directions other than the intended waveguide direction, thus reducing leakage in such structures. Gap waveguides are suitable for some applications but have limitations in size, typical height of pins is the wavelength divided by 2 to 6, i.e. lambda/2 to lambda/6.

SUMMARY OF THE INVENTION

Although technologies for compact waveguides are available, there is a need for compact components, low loss components with good reduction of loss and leakage. SIW, as one example, have an inherent insertion loss that is higher than the corresponding loss of for example air-filled hollow waveguide. Thus, although they provide a cost-efficient alternative there are a need for other solutions. Hollow waveguides generally have other drawbacks, for example the magnetic fields penetrate a short distance into the metal creating leaks that become substantial if there is a gap between two layers, especially if the gap is in the horizontal direction, when making hollow waveguide structure in split-blocks. The reason for this drawback is that the electromagnetic waves are tightly confined and meant to penetrate only a very short distance into the metal.

Dielectric waveguides are another option to reduce leakage. However, the characteristics of the problem is different for such waveguides due to for example, the non-propagating evanescent wave. This is also the reason why such waveguides require high level of conductivity between layers in order to reduce leakage. The high level of conductivity significantly increases the production cost and requires very high accuracy during manufacturing. In addition, the losses are, in general, still higher than for air-filled waveguide.

Gap waveguides have limitations both in design and size of pin texture, thereby making gap waveguides a useful solution but are not applicable for some applications.

A further problem exists in relation to manufacturing of waveguides is that the current level of CNC-milling and molding often provides poor tolerances in the production method compared to other methods such as laser cutting, etching, or chemical etching. This problem makes it difficult and/or expensive to produce waveguide structures. The problem is more evident for some frequency ranges than for other frequency ranges, for example both CNC-milling and molding are common production methods for waveguides adapted for frequencies below 60 GHz. In higher E-band and D-band frequency range, 71 GHz to 86 GHz and 110 GHz to 170 GHz, the CNC-milling and molding becomes very expensive because everything is very small in relation to how the production technology works. Thereby, it is in some cases not suitable and in some cases not even possible to achieve the desired result.

An object is to provide a new realization of air-filled waveguide transmission line that is easy to produce.

Another object is to provide a waveguide that is cost effective to produce.

Another object is to provide a waveguide that conveniently can be used and design for antenna arrays.

Another object is to provide a waveguide that conveniently can be used to design waveguide filters and diplexers.

Another object is to provide a waveguide that conveniently can be used for active electronic circuits, i.e. power amplifiers (PA), packaging and integration with passive components such as array antennas.

Another object is to provide a multi-layer waveguide with stacked unconnected layers with low leakage.

Another object is to provide a multi-layer waveguide that don't require galvanic contact between the layers to reduce leakage.

Another object of the present invention is to provide a multi-layer waveguide that don't require connectivity between the layers to reduce leakage.

Yet another object of the present invention is to provide a multi-layer waveguide that is compact in comparison to prior art solutions.

It would thus be beneficial with a waveguide that is compact and overcomes at least some of the drawbacks of the prior art.

Thus, the present solution relates to a cost efficient and easy to produce multi-layer waveguide transmission line with electromagnetic metasurfaces arranged in a specific configuration. The solution is a compact air-filled waveguide with unconnected thin layers stacked together and overcoming many of the drawbacks of prior art solutions. The solution can advantageously be used with metal layers with typical thickness of lambda/10 or lambda/15 and depth of the leak suppressing structure below lambda/20 or even lambda/30. The multi-layer waveguide comprises at least three physical layers assembled into a multi-layer waveguide. The layers are at least one top layer, one or more intermediate layer, and one bottom layer. The multi-layer waveguide further comprises a waveguide channel being an elongated aperture in at least one intermediate layer. At least one layer has a metasurface on a first surface facing a first adjoining layer and the metasurface surrounds the elongated aperture. The metasurface comprise thick and thin sections.

The waveguide channel is in different embodiments arranged with different sizes of elongated apertures in the layers, in some embodiments all layers have different sizes of elongated apertures and in other embodiments some of the layers have corresponding apertures.

The metasurface is a textured surface that have a sub-wavelength thickness, in this particular case, normally below lambda/10. The textured surface comprises thin and thick sections that creates the texture.

It is one advantage that the meta structure in the multi-layer arrangement create a leak reduction effect by the small gap between the layers and the metasurfaces. The effect comes from an electromagnetic band gap but in comparison to previous multi-layer waveguides the metasurface structure has the advantage of being smaller in size and still inexpensive to produce.

According to one embodiment, the first surface has a flat portion surrounding the metasurface. The thick sections have a thickness corresponding to the layer thickness at the flat portion and the thin sections have a thickness that is less than the thickness at the flat portion.

According to one embodiment, a second surface of the intermediate layer is facing a second adjoining layer that has a flat surface except for the elongated aperture.

The metasurface faces a flat surface creating small air-filled spaces between the surfaces of the layers creating an electromagnetic band gap structure.

According to one embodiment, the layers are stacked separate layers without elements extending between the layers.

It is one advantage with the present solution that a small gap is acceptable between all or some of the layers without increasing leakage.

According to one embodiment, each thick section has any one of a circular, elliptical, triangular, square, pentagonal, hexagonal, or rectangular shape.

It is one advantage that the shape of the thick sections could vary between different layers or different waveguides.

According to one embodiment, the thick sections are arranged in rows parallel to the elongated aperture.

According to one embodiment, the thick sections are arranged at irregular distances from the elongated aperture.

According to one embodiment, the thick sections are arranged in a random pattern surrounding the elongated aperture.

According to one embodiment, the metasurface surrounds the elongated aperture.

According to one embodiment, the multi-layer waveguide comprises a first, second, and third intermediate layer each comprises an elongated aperture, and the second intermediate layer further comprises a central member arranged within the elongated aperture.

In different embodiments all or some layers have metasurfaces. In one embodiment only intermediate layers have metasurfaces, in another embodiment at least one of the top and bottom layers have a metasurface. The metasurfaces are in one embodiment arranged to face a flat surface of an adjoining layer, i.e. two metasurfaces don't face each other in such an embodiment.

According to one embodiment, the multi-layer waveguide comprises a first, second, and third intermediate layer wherein the second intermediate layer is a non-textured layer for integrated electronic chipsets.

It is one advantage that a non-textured layer, i.e. a layer without a metasurface could be used for integrating electronic chipsets.

According to one embodiment, the difference in thickness between the thick sections and the thin sections of the metasurface is less than the wavelength divided by 10.

According to one embodiment, the difference in thickness between the thick sections and the thin sections of the metasurface is less than the wavelength divided by 20.

According to one embodiment, the difference in thickness between the thick sections and the thin sections of the metasurface is less than the wavelength divided by 30.

It is one advantage with the present solution that the metasurface enables waveguides that are smaller in size when compared to other available alternatives without increasing the leakage. It is another advantage that the multi-layer structure in combination with the metasurfaces that leakage between the layers is significantly reduced. Although a larger metasurface is a possibility, it is one clear advantage that smaller metasurfaces are easier to produced than alternatives for corresponding frequencies.

According to one aspect, a method for producing a multi-layer waveguide as described herein is disclosed.

According to an embodiment, the metasurface of different layers in the multi-layer waveguide has an asymmetric configuration.

It is one advantage of the present solution that the metasurfaces of each layer in the multi-layer waveguide that has a metasurface don't have to be identical. The metasurfaces could for example be arranged with thick and thin sections aligning with each other between layers or arranged in an asymmetric configuration wherein the thin and thick sections don't align.

According to an embodiment, the thin and thick sections are arranged periodically along a perimeter outside the elongated aperture of each layer.

According to one embodiment, the metasurface is not identical on each layer.

According to an embodiment, the central member of an elongated aperture is connected to the rest of the layer with one connection tab spanning the aperture, wherein the connection tab is an integrated part of the layer.

According to an embodiment, the distance between the layers of the multi-layer waveguide is between 0 and 20 microns.

According to an embodiment, the distance between the layers of the multi-layer waveguide is between 0 and 50 microns.

According to an embodiment, the multi-layer waveguide is a transmission line implemented as any one of an antenna, an antenna array, and a filter.

It is one advantage with the present solution that the multi-layer waveguide can be implemented as for example a slotted waveguide antenna.

It is another advantage with the present solution that the multi-layer waveguide can be implemented for chipset packaging, such as packaging of MMIC (Monolithic Microwave Integrated Circuit).

According to an embodiment, the waveguide is made from one single material.

According to an embodiment, the multi-layer waveguide is made from layers of a single material coated with a metal.

According to an embodiment, the multi-layer waveguide is assembled with a non-conductive adhesive.

According to an embodiment, the layers are directly stacked.

According to an embodiment, the layers are stacked unconnected thin layers.

It is one advantage that the multi-layer waveguide does not require any galvanic, electric, or physical connection between the layers. That is, a small gap can exist between the layers. This gap could, for example, be an uncontrolled air gap from production of the layers. The gap could also be on a micron level or even an atomic level.

According to an embodiment, the layers are stacked unconnected thin metal layers.

According to an embodiment, the layers of the multi-layer waveguide is held together with any one of a conductive glue, an isolating glue, and two screws.

It is one advantage with the present solution that any form of bonding or attachment means can be used to hold the layers together. The reason for this advantage is that no electric conductivity is required between the layers in order to suppress leakage. However, it shall be noted that conductivity would not affect the performance in a negative way. That is, the multi-layer waveguide according to the solution as described herein works well regardless of the conductive properties between the layers.

BRIEF DESCRIPTION OF THE DRAWINGS

The invention is now described, by way of example, with reference to the accompanying drawings, in which.

DETAILED DESCRIPTION OF THE EMBODIMENTS

In the following, a detailed description of the different embodiments of the invention is disclosed under reference to the accompanying drawings, where like features are denoted by the same reference labels throughout the detailed description of the drawings. All examples herein should be seen as part of the general description and are therefore possible to combine in any way of general terms. Individual features of the various embodiments and aspects may be combined or exchanged unless such combination or exchange is clearly contradictory to the overall function of the multi-layer waveguide, arrangement, or production method thereof.

Briefly described the solution relates to a compact multi-layer waveguide without any requirement for electrical and galvanic contact between the layers.

The multi-layer waveguide has metasurfaces in layers arranged as leak suppressing structure for reducing energy leakage between the layers of the waveguide. The metasurface comprise multiple thick and thin sections surrounding a waveguide channel.

Figure 1:
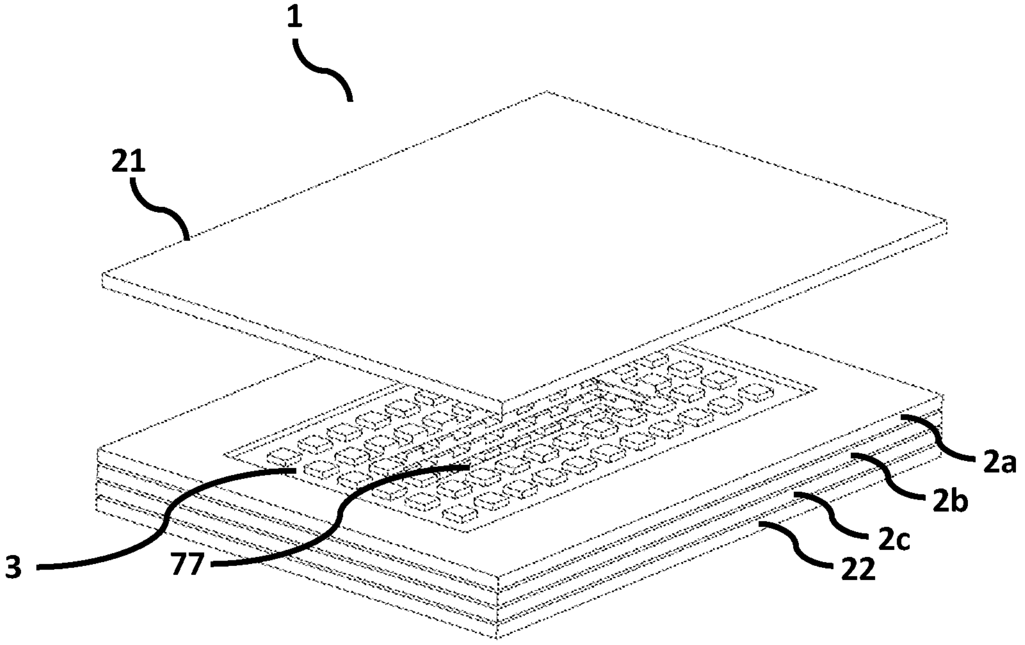
FIG. 1 illustrates one embodiment of a multi-layer waveguide with layers comprising a metasurface, wherein the top layer is presented as an exploded view.

FIG. 1 illustrates one embodiment of a multi-layer waveguide 1 with multiple layers 21, 2*a*, 2*b*, 2*c*, 22 of a multi-layer waveguide. The intermediate layers 2*a*, 2*b*, 2*c* each has an elongated aperture 7 (FIG. 2) that alone or together with elongated apertures of other layers creates a waveguide channel 77. The elongated aperture 7 is in some or all of the intermediate layers surrounded by a metasurface.

Figure 2:
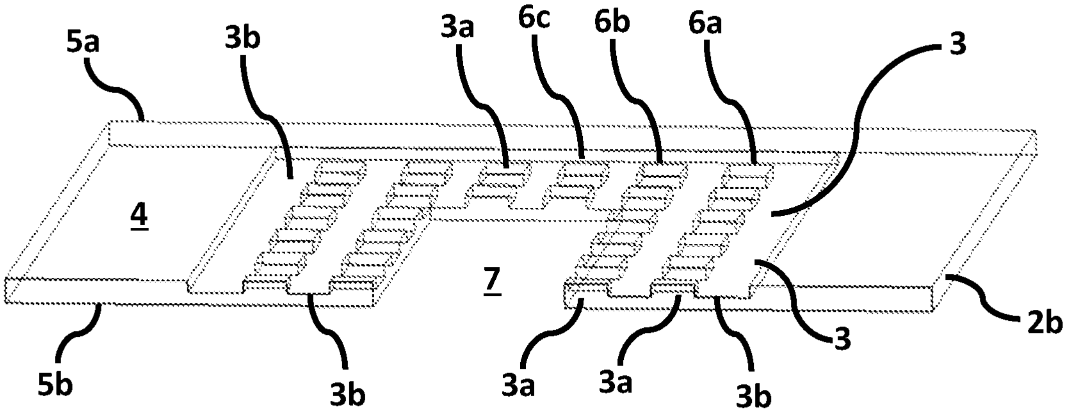
FIG. 2 illustrates one embodiment of an isometric cross-section of an intermediate layer.

FIG. 2 illustrates a cross-section of part of an intermediate layer 2*b*. The layer comprises an elongated aperture 7 wherein only a part of the elongated aperture 7 is visible in the illustration of FIG. 2. The elongated aperture 7 is surrounded by a metasurface 3 comprising thick sections 3*a* and thin sections 3*b*. The thick sections 3*a* and thin sections 3*b* together creates the metasurface, wherein the metasurface is leak suppressing in the way that the metasurface helps guide the wave and keep the wave within the waveguide channel 77 that the elongated aperture 7 is a part thereof.

FIG. 2 further illustrates a flat portion 4 surrounding the metasurface 3. The flat portion 4, in one embodiment has the same thickness as the thick sections 3*a*. In the embodiment as illustrated in FIG. 2, the thick sections 3*a* are arranged in straight rows 6*a*, 6*b*, 6*c*. In one embodiment the number of straight rows 6*a*, 6*b*, 6*c* could be one, two, three or more at any or all sides of the elongated aperture 7.

Figure 3:
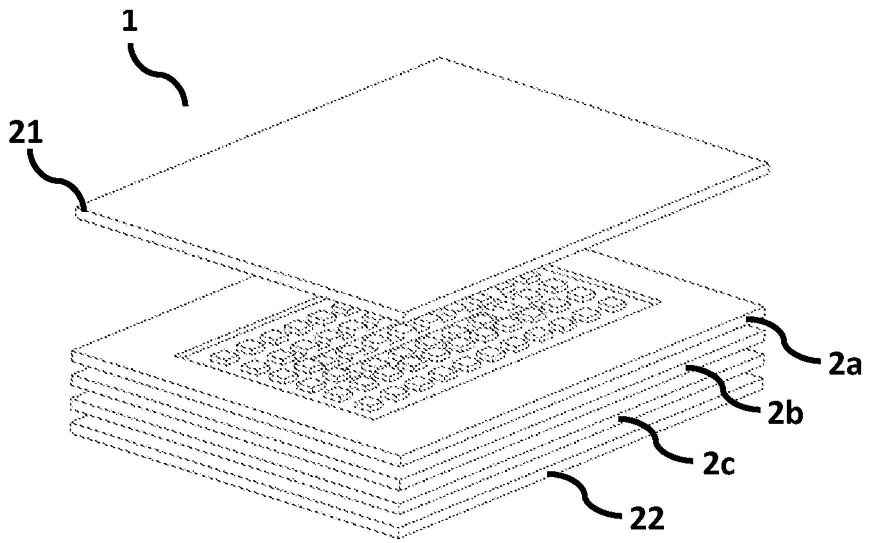
FIG. 3 illustrates an exploded view of one embodiment of a multi-layer waveguide with layers comprising a metasurface.

FIG. 3 illustrates one embodiment of the multi-layer waveguide 1, wherein the layers are spaced apparat. This exploded view illustrates an important feature of the multi-layer waveguide 1 in that no galvanic, electric, or physical connection is required between the layers. That is, a small gap can exist between the layers. This gap could for example be an uncontrolled air gap from production of the layers. The gap could also be on a micron level or even an atomic level. However, it shall be noted that the size of the gap as illustrated in FIG. 3 is only for illustration, the gap between the layers could typically be anywhere between 0 and 15 micrometers.

Figure 4:
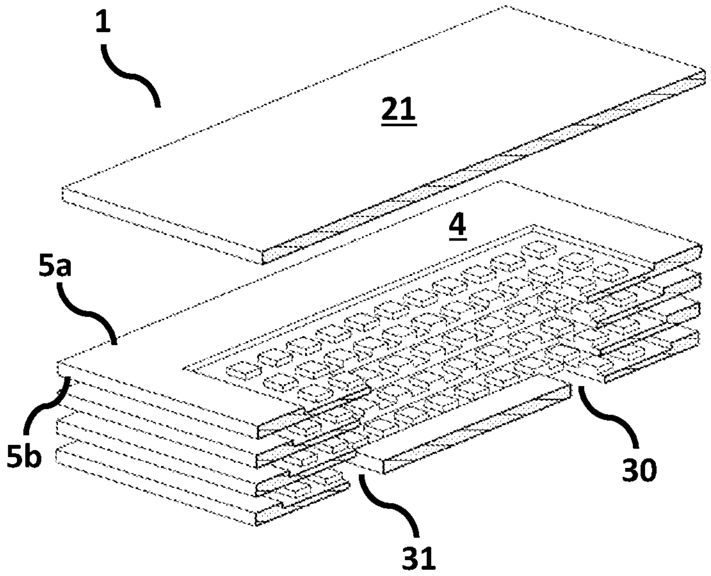
FIG. 4 illustrates a cross-section of an embodiment as illustrated in FIG. 3.

FIG. 4 illustrates a cross-section of one embodiment of a multi-layer waveguide 1 wherein the entry opening 30 and exit opening 31 are visible. Those openings 30, 31 are the openings wherein the wave enter and exits the waveguide channel 77. FIG. 4 further illustrates a first surface 5*a* and second surface 5*b* identified for one intermediate layer 2*b* as illustrated in FIG. 2. It shall be noted that each layer comprises a first surface 5*a* and second surface 5*b*. The entry opening 30 and exit opening 31 do not have to be arranged in the bottom layer 22. In another embodiment the entry opening 30 and exit opening 31 are instead arranged in the top layer 21 (not illustrated in FIG. 4). In yet another embodiment (not illustrated) the entry opening 30 and exit opening 31 are arranged in different layers, for example, the entry opening 30 could be arranged in the top layer 21 and the exit opening 31 in the bottom layer 22, or vice versa.

Figure 5:
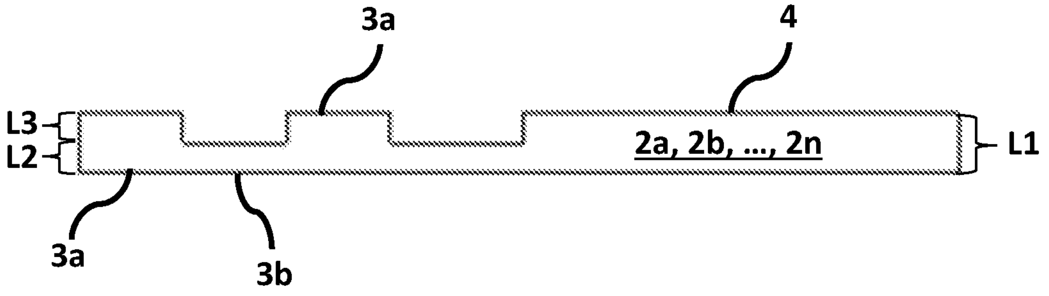
FIG. 5 illustrates a cross-section of part of an intermediate layer where thin and thick sections of a metasurface is illustrated in detail.

FIG. 5 illustrates parts of an intermediate layer 2*a*, 2*b*, . . . , 2*n* or part of a top layer 21 (FIG. 4) or a bottom layer 22 (FIG. 3) with a metasurface 3 (FIG. 2). FIG. 5 illustrates differences in thickness between the thick sections 3*a* (having a thickness L1) and thin sections 3*b* (having a thickness L2) as well as the flat portion 4. The difference can for example be between 50-70%, 50-60%, 55-65%, or 60-70% of the total thickness of the layer, however the difference in thickness L3 might vary also outside said range.

Figure 6:
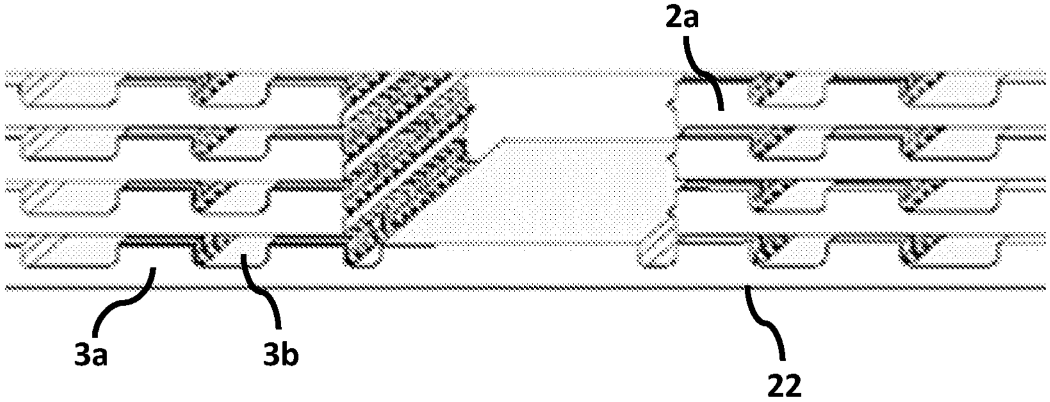
FIG. 6 illustrates a cross-section showing one embodiment of metasurfaces in multiple layers wherein the metasurface is produced using chemical etching as the fabrication method.

FIG. 6 illustrates one embodiment of the metasurfaces 3 (FIG. 2) wherein the metasurface 3 was produced by metal chemical etching creating a characteristic shape of the edges in the metasurface, the shape of the edges in the metasurface becomes rounded. It shall be noted that other production methods such as CNC, laser cutting etc. also are possible.

Figure 7:
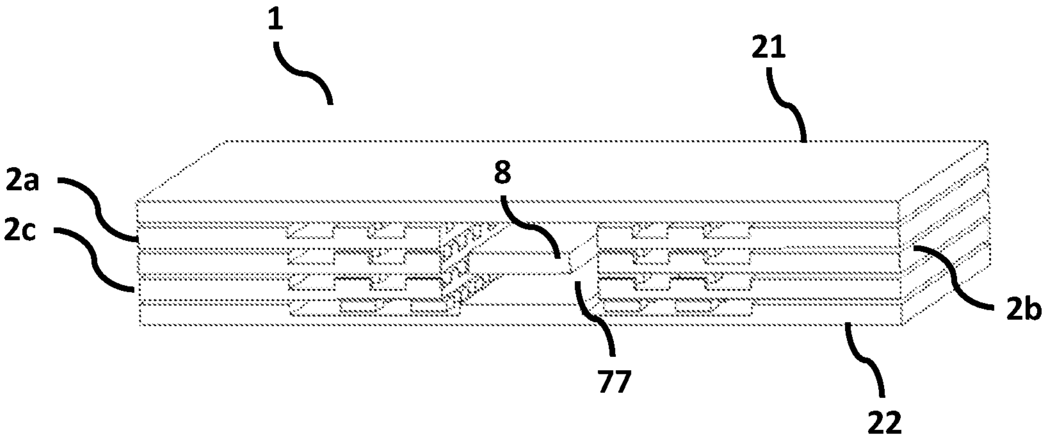
FIG. 7 illustrates one embodiment showing a co-axial multi-layer waveguide with metasurfaces in multiple layers.

FIG. 7 illustrates a co-axial multi-layer waveguide 1 wherein the waveguide channel 77 comprises a central member 8 arranged within the elongated aperture 7 (FIG. 2) of one intermediate layer 2*a*, 2*b*, 2*c*. The center member 8 is attached to the remainder of the layer at one or more place connecting the central member to the layer and keeping it in place.

Figure 8:
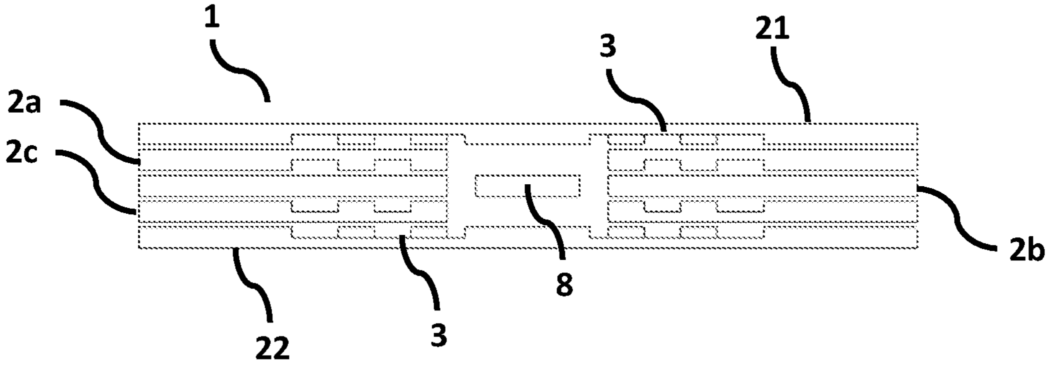
FIG. 8 illustrates a cross-section of one embodiment of a co-axial multi-layer waveguide with a flat layer between multiple layers with metasurfaces.

FIG. 8 illustrates one embodiment of a co-axial multi-layer waveguide 1 wherein the top layer 21 and the bottom layer 22 have metasurfaces 3. It shall be noted that the top layer 21 and the bottom layer 22 in some embodiments have metasurfaces 3 and in some other embodiments the top layer 21 and bottom layer 22 does not have metasurfaces 3. Further, in some embodiments, one or more intermediate layer does not have a metasurface 3.

Figure 9:
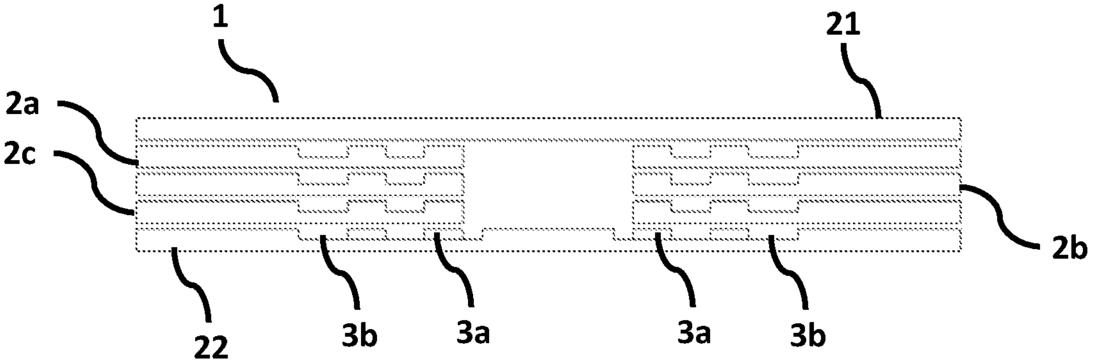
FIG. 9 illustrates a cross-section of one embodiment of a rectangular multi-layer waveguide with metasurfaces in a bottom layer.

FIG. 9 illustrates another embodiment of a multi-layer waveguide 1 wherein the top layer 21 does not have any metasurface but the intermediate layers 2*a*, 2*b*, 2*c* and the bottom layer 22 have metasurfaces 3*a* and 3*b*.

Figure 10:
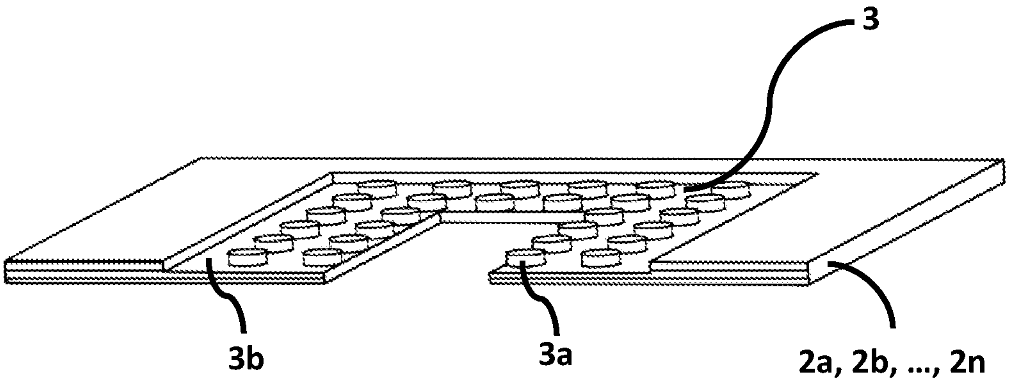
FIG. 10 illustrates one embodiment wherein the metasurface section have a round shape.

FIG. 10 illustrates one embodiment of an intermediate layer 2*a*, 2*b*, . . . , 2*n*, wherein the thick sections 3*a* have a round shape. It shall be noted that the shape is not important to the functionality and the metasurface 3 may have thick sections 3*a* of many different shapes, both in the same and in different metasurfaces 3.

Figure 11:
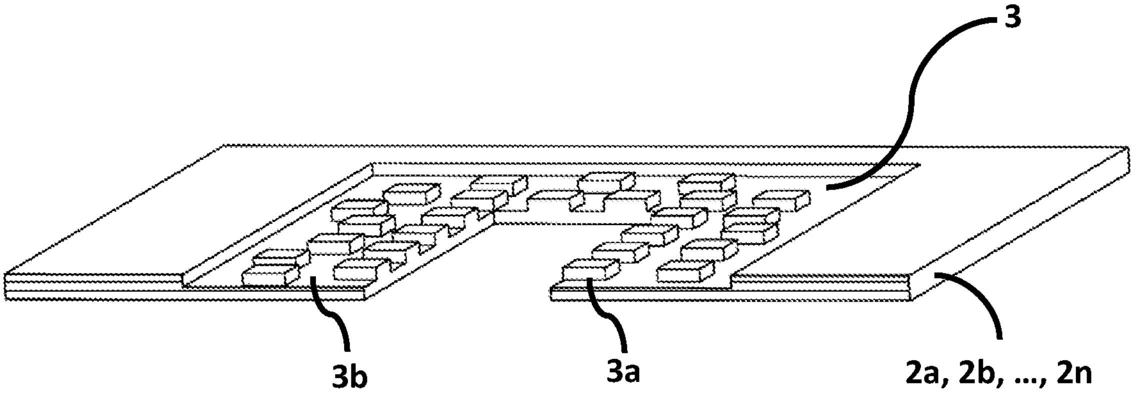
FIG. 11 illustrates one embodiment wherein the thick and/or thin sections are unevenly arranged in the metasurface.

FIG. 11 illustrates another embodiment wherein the thick sections 3*a* of the metasurface 3 are randomly placed around the elongated aperture 7 (FIG. 2). FIG. 11 is a representation of how the thick sections 3*a* could be arranged, but it shall be noted that described arrangements of the thick sections herein are only examples and other arrangements of the thick sections 3*a* is also possible within the scope of the claims. The small gap between the layers and the metasurface provide the electromagnetic bandgap (EBG) structure.

Figure 12:
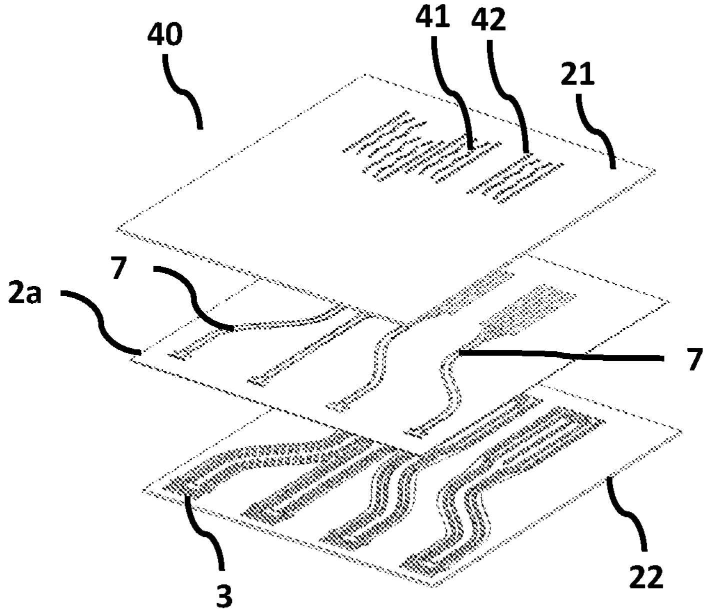
FIG. 12 illustrates one embodiment wherein multiple waveguides are arranged as slotted waveguide antennas in one unit.

FIG. 12 illustrates an exploded isometric view of a multi-layer slotted waveguide antenna 40 as one implementation of waveguides 1 (FIG. 1) as described herein. The embodiment as illustrated in FIG. 12 shows a top layer 21, an intermediate layer 2*a*, and a bottom layer 22. The top layer 21 comprise antenna slots 41 and corrugations 42 arranged at one end of the waveguide 1. The intermediate layer 2*a* comprise elongated apertures 7 providing routing in each waveguide 1. The bottom layer 22 and the top layer 21 comprise meta surfaces 3 arranged to surround the elongated apertures 7 of the intermediate layer 2*a*.

The elongated apertures 7 as illustrated in FIG. 12 comprise support structures for enhancing the mechanical support of the layer. The support structures are arranged within the elongated apertures 7 providing an embodiment wherein multiple elongated apertures 7 are arranged instead of a single aperture extending the entire length. In one embodiment this is merely for structural support.

Figure 13:
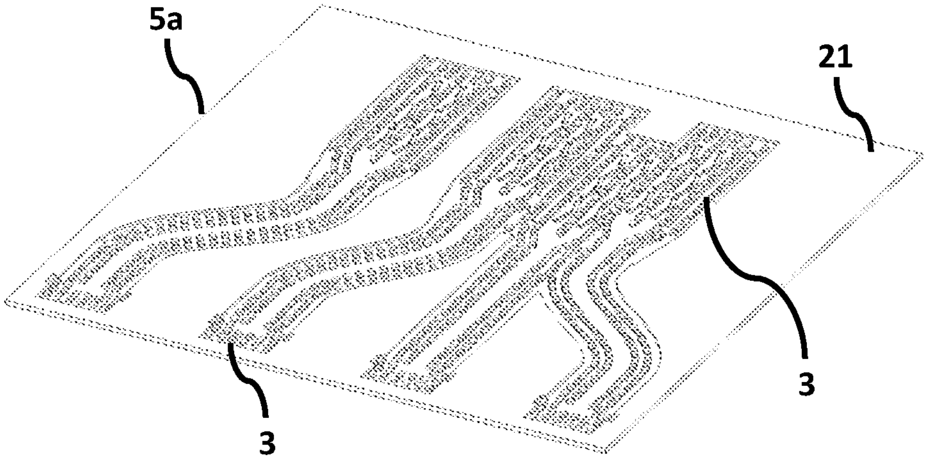
FIG. 13 illustrates a bottom view of a top layer according to the embodiment as illustrated in FIG. 12.

FIG. 13 illustrates an inverted bottom view of the top layer 21 as illustrated in FIG. 12. As shown, the top layer 21 in one embodiment comprises meta surfaces 3 arranged to surround the elongated apertures 7 of the intermediate layer 2*a* as illustrated in FIG. 12. As understood, the embodiments as illustrated in FIGS. 12 and 13 are merely examples of how the solution as described herein could be implemented as a slotted waveguide antenna 40 as illustrated in FIG. 12. FIGS. 12 and 13 further illustrates how the routing of the waveguide 1 may differ depending of the implementation. For example, the routing may in one embodiment be straight and in another comprise one or more turns.

Figure 14:
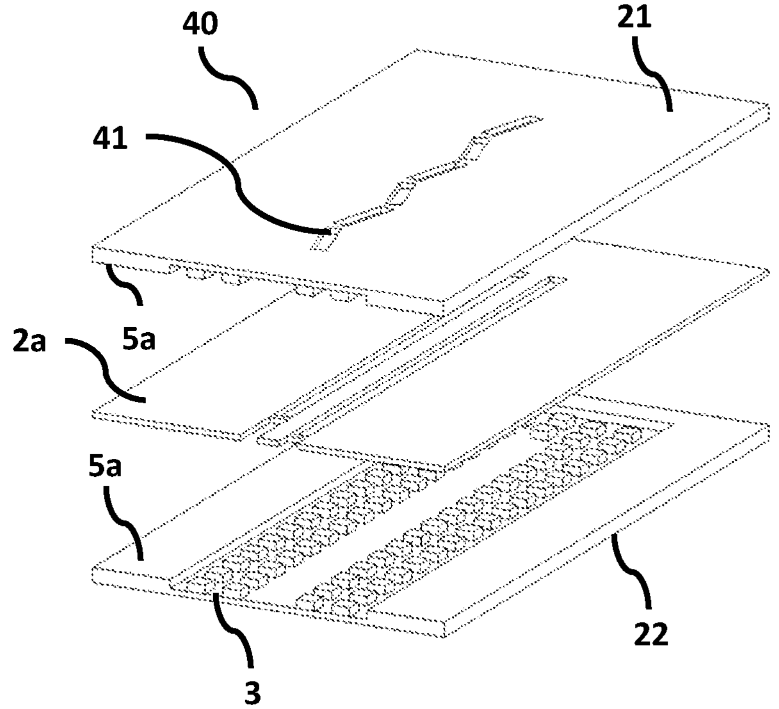
FIG. 14 illustrates one embodiment of a multi-layer waveguide arranged as a slotted waveguide antenna.
Figure 15:
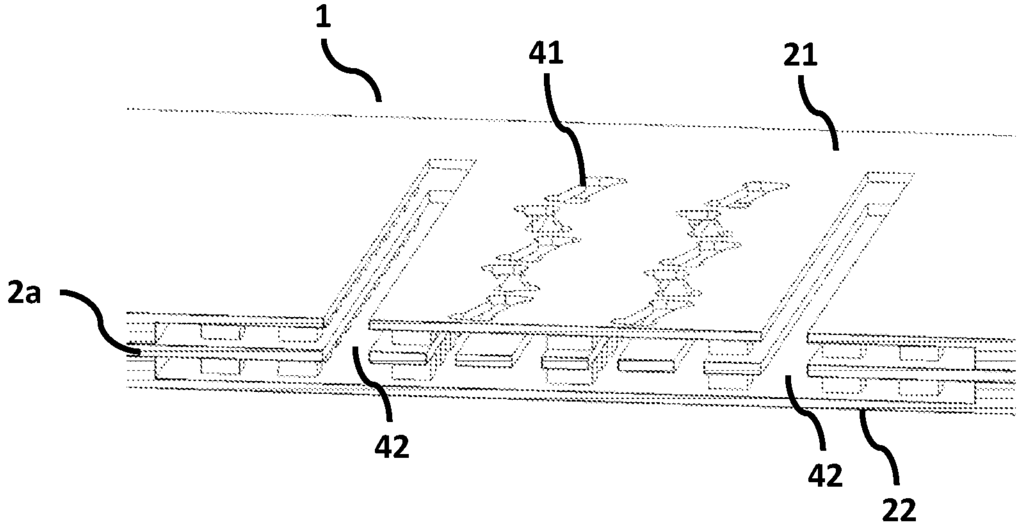
FIG. 15 illustrates one embodiment of a multi-layer waveguide arranged as a slotted waveguide antenna, wherein corrugations to reduce unwanted signal propagations are arranged in the extension direction of the waveguide channel.

FIG. 14 illustrate one embodiment of a multi-layer waveguide 1 (FIG. 1) implemented as a slotted waveguide antenna 40. FIG. 15 illustrate a slightly more complex multi-layer waveguide 1 implemented as a slotted waveguide antenna 40 as illustrated in FIG. 14, wherein corrugations 42 (FIG. 15) are arranged to reduce ripple in the transmission pattern. The corrugations 42 reduce surface currents in the top layer and thus enhance the propagation pattern. As illustrated in FIG. 15 the corrugations 42 extend through the top 21 and intermediate layer 2*a*. In another embodiment wherein the multi-layer waveguide implemented as a slotted waveguide antenna 40 comprise additional intermediate layers 2*b*, 2*c*, . . . , 2*n*, (not illustrated in FIG. 15) the corrugations 42 extends through the top layer 21 and the intermediate layers 2*a*, 2*b*, 2*c*, . . . , 2*n*. In yet another embodiment the corrugations 42 extend through at least the top layer 21 and at least some of the intermediate layers 2*a*, 2*b*, 2*c*, . . . , 2*n*.

The invention claimed is:

1. A multi-layer waveguide comprising at least three physical layers assembled into a multi-layer waveguide, wherein the layers are a top layer, one or more intermediate layer, and a bottom layer, the multi-layer waveguide comprising a waveguide channel being an elongated aperture in at least one intermediate layer, wherein at least one layer of the multi-layer waveguide has a metasurface on a first surface thereof, the first surface facing a first adjoining layer, wherein the metasurface surrounds the elongated aperture and comprises thick and thin sections, wherein any one of the top layer and the bottom layer comprise the metasurface.

2. The multi-layer waveguide according to claim 1, wherein the first surface has a flat portion surrounding the metasurface, and wherein the thick sections have a thickness corresponding to a layer thickness at the flat portion and the thin sections have a thickness that is less than the thickness at the flat portion.

3. The multi-layer waveguide according to claim 1, wherein a second surface of the at least one layer having the metasurface on the first surface thereof is a flat surface except for the elongated aperture.

4. The multi-layer waveguide according to claim 1, wherein the layers are stacked separate layers without elements extending between the layers.

5. The multi-layer waveguide according to claim 1, wherein each thick section has any one of a circular or rectangular shape.

6. The multi-layer waveguide according to claim 1, wherein the thick sections are arranged in rows parallel to a side of the elongated aperture.

7. The multi-layer waveguide according to claim 1, wherein the difference in thickness between the thick sections and the thin sections of the metasurface is less than an operational wavelength of the multi-layer waveguide divided by 10.

8. The multi-layer waveguide according to claim 1, wherein the top layer comprises antenna slots.

9. The multi-layer waveguide according to claim 1, wherein the at least one intermediate layer comprises first, second, and third intermediate layers each comprising a respective elongated aperture forming the waveguide channel, and wherein the second intermediate layer further comprises a central member arranged within the elongated aperture of the second intermediate layer.

10. The multi-layer waveguide according to claim 1, wherein the at least one intermediate layer comprises first, second, and third intermediate layers wherein the second intermediate layer is a flat layer for integrated electronic chipsets.

11. The multi-layer waveguide according to claim 1, wherein the difference in thickness between the thick sections and the thin sections of the metasurface is less than an operational wavelength of the multi-layer waveguide divided by 20.

12. The multi-layer waveguide according to claim 1, wherein the difference in thickness between the thick sections and the thin sections of the metasurface is less than an operational wavelength of the multi-layer waveguide divided by 30.

13. The multi-layer waveguide according to claim 1, wherein the multi-layer waveguide is implemented as a slotted waveguide antenna.

14. A multi-layer waveguide comprising at least three physical layers assembled into a multi-layer waveguide, wherein the layers are a top layer, one or more intermediate layer, and a bottom layer, the multi-layer waveguide comprising a waveguide channel being an elongated aperture in at least one intermediate layer, wherein at least one layer of the multi-layer waveguide has a metasurface on a first surface thereof, the first surface facing a first adjoining layer, wherein the metasurface surrounds the elongated aperture and comprises thick and thin sections, wherein any one of the top layer and the bottom layer comprise the metasurface, and wherein a difference in thickness between the thick sections and the thin sections of the metasurface is less than an operational wavelength of the multi-layer waveguide divided by 10.

* * * * *